United States Patent
Dozier (10) Patent No.: US 8,782,516 B1
(45) Date of Patent: Jul. 15, 2014

(54) CONTENT STYLE DETECTION

(75) Inventor: William D. Dozier, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 1405 days.

(21) Appl. No.: 11/963,786

(22) Filed: Dec. 21, 2007

(51) Int. Cl.
G06F 17/18 (2006.01)

(52) U.S. Cl.
USPC .......................................... 715/243; 715/236

(58) Field of Classification Search
USPC .................. 382/225; 715/539, 204, 243, 238
See application file for complete search history.

(56) References Cited

U.S. PATENT DOCUMENTS

| | | |
|---|---|---|
| 4,741,045 A | 4/1988 | Denning |
| 4,754,489 A | 6/1988 | Bokser |
| 5,029,107 A | 7/1991 | Lee |
| 5,164,899 A | 11/1992 | Sobotka et al. |
| 5,179,650 A | 1/1993 | Fukui et al. |
| 5,285,526 A | 2/1994 | Bennett et al. |
| 5,335,290 A | 8/1994 | Cullen et al. |
| 5,465,304 A * | 11/1995 | Cullen et al. ............... 382/176 |
| 5,590,257 A | 12/1996 | Forcier |
| 5,671,438 A | 9/1997 | Capps et al. |
| 5,689,342 A | 11/1997 | Nakatsuka |
| 5,774,580 A | 6/1998 | Saitoh |
| 5,778,103 A * | 7/1998 | Allan et al. ............... 382/254 |
| 5,784,487 A | 7/1998 | Cooperman |
| 5,802,533 A | 9/1998 | Walker |
| 5,848,184 A | 12/1998 | Taylor et al. |
| 5,850,490 A | 12/1998 | Johnson |
| 5,860,074 A | 1/1999 | Rowe et al. |
| 5,907,631 A | 5/1999 | Saitoh |
| 5,933,531 A | 8/1999 | Lorie |
| 5,978,819 A | 11/1999 | Berstis |
| 6,002,798 A | 12/1999 | Palmer et al. |
| 6,032,163 A | 2/2000 | Tou et al. |
| 6,256,610 B1 | 7/2001 | Baum |
| 6,269,188 B1 | 7/2001 | Jamali |
| 6,298,357 B1 * | 10/2001 | Wexler et al. ............... 715/210 |
| 6,377,704 B1 | 4/2002 | Cooperman |
| 6,487,570 B1 | 11/2002 | Forcier |

(Continued)

FOREIGN PATENT DOCUMENTS

| | | |
|---|---|---|
| EP | 1343095 A2 | 9/2003 |
| JP | 07-192084 A | 7/1995 |

(Continued)

OTHER PUBLICATIONS

Curtis Frye, Microsoft Office System Step by Step, Sep. 17, 2003, 2003 Edition, pp. 51-66.*

(Continued)

*Primary Examiner* — Doug Hutton, Jr.
*Assistant Examiner* — Brian Garmon
(74) *Attorney, Agent, or Firm* — Knobbe, Martens, Olson & Bear, LLP (57) ABSTRACT

Determination of content style attributes of an image having content thereon is disclosed. The content may be a paragraph of text with a column layout designation. The content style attribute determination may include determining one or more of paragraph alignment, vertical and horizontal margin values, indentation, line spacing, and tracking values. The content style attributes may be determined for each paragraph separately or by grouping paragraphs by the column layout designation. The content style attributes may be used to format content in images for presentation on end user devices.

21 Claims, 8 Drawing Sheets

(56) References Cited

U.S. PATENT DOCUMENTS

| | | | |
|---|---|---|---|
| 6,510,243 B1 | 1/2003 | Ikeda | |
| 6,562,077 B2 * | 5/2003 | Bobrow et al. | 715/204 |
| 6,766,495 B1 | 7/2004 | Bates et al. | |
| 6,915,484 B1 | 7/2005 | Ayers et al. | |
| 6,956,587 B1 | 10/2005 | Anson | |
| 6,978,046 B2 * | 12/2005 | Robinson et al. | 382/209 |
| 6,981,209 B1 * | 12/2005 | Parikh et al. | 715/212 |
| 7,171,061 B2 | 1/2007 | Sarkar et al. | |
| 7,213,035 B2 | 5/2007 | Ornstein et al. | |
| 7,219,309 B2 | 5/2007 | Kaasila et al. | |
| 7,272,258 B2 | 9/2007 | Berkner et al. | |
| 7,362,311 B2 * | 4/2008 | Filner et al. | 345/169 |
| 7,392,472 B2 | 6/2008 | Simard et al. | |
| 7,412,647 B2 | 8/2008 | Sellers et al. | |
| 7,433,548 B2 | 10/2008 | Goodwin et al. | |
| 7,460,710 B2 | 12/2008 | Coath et al. | |
| 7,469,388 B1 | 12/2008 | Baudisch et al. | |
| 7,486,628 B1 | 2/2009 | Brisebois et al. | |
| 7,715,635 B1 * | 5/2010 | Shagam et al. | 382/225 |
| 7,870,503 B1 | 1/2011 | Levy et al. | |
| 7,899,249 B2 | 3/2011 | Furmaniak et al. | |
| 7,930,634 B2 | 4/2011 | Nakamura | |
| 2002/0052898 A1 | 5/2002 | Schlit et al. | |
| 2002/0191847 A1 | 12/2002 | Newman et al. | |
| 2003/0014445 A1 | 1/2003 | Formanek et al. | |
| 2003/0126558 A1 | 7/2003 | Griffin | |
| 2003/0128234 A1 | 7/2003 | Brown et al. | |
| 2003/0135649 A1 | 7/2003 | Buckley et al. | |
| 2003/0231219 A1 | 12/2003 | Leung | |
| 2004/0004641 A1 | 1/2004 | Gargi | |
| 2004/0006742 A1 | 1/2004 | Slocombe | |
| 2004/0101198 A1 | 5/2004 | Barbara | |
| 2004/0103371 A1 | 5/2004 | Chen et al. | |
| 2004/0139384 A1 | 7/2004 | Lin | |
| 2004/0146199 A1 * | 7/2004 | Berkner et al. | 382/176 |
| 2004/0202352 A1 | 10/2004 | Jones | |
| 2004/0205568 A1 | 10/2004 | Breuel et al. | |
| 2005/0116954 A1 | 6/2005 | Ripps et al. | |
| 2005/0125549 A1 | 6/2005 | Katayama | |
| 2005/0128516 A1 | 6/2005 | Tomita | |
| 2005/0234893 A1 | 10/2005 | Hirsch | |
| 2006/0005116 A1 | 1/2006 | Ferguson et al. | |
| 2006/0080309 A1 | 4/2006 | Yacoub et al. | |
| 2006/0181742 A1 | 8/2006 | Lech et al. | |
| 2006/0227153 A1 | 10/2006 | Anwar et al. | |
| 2006/0271847 A1 | 11/2006 | Meunier | |
| 2006/0282838 A1 | 12/2006 | Gupta et al. | |
| 2006/0288278 A1 | 12/2006 | Kobayashi | |
| 2006/0288279 A1 | 12/2006 | Yacoub et al. | |
| 2007/0061704 A1 | 3/2007 | Simova et al. | |
| 2007/0112810 A1 | 5/2007 | Jonsson | |
| 2007/0208996 A1 | 9/2007 | Berkner et al. | |
| 2007/0234203 A1 | 10/2007 | Shagam et al. | |
| 2008/0037873 A1 | 2/2008 | Berkner et al. | |
| 2008/0267535 A1 | 10/2008 | Goodwin et al. | |
| 2009/0087094 A1 | 4/2009 | Deryagin et al. | |

FOREIGN PATENT DOCUMENTS

| | | |
|---|---|---|
| JP | 2004005453 A | 1/2004 |
| JP | 2004532430 T | 10/2004 |
| WO | WO 02/089105 A2 | 11/2002 |

OTHER PUBLICATIONS

U.S. Appl. No. 11/392,999, filed Mar. 28, 2006, R. Goodwin et al, "Processing Digital Images Including Headers and Footers into Reflow Content", 48 pages.

U.S. Appl. No. 11/540,852, filed Sep. 28, 2006, J. Shagam et al, "Identifying Similarly Formed Paragraphs in Scanned Images", 30 pages.

Boychuk, B., Shortcovers for iPhone Review, Macworld.com, http://www.macworld.com/article/141540/2009/07/shortcovers.html, Jul. 6, 2009, pp. 3.

Breuel, T.M., et al., Reflowable Document Image, Chapter 1, pp. 1-14, (http://citeseerx.ist.psu.edu/viewdoc/download?doi=10.1.1.12.9828&rep=rep1&type=pdf) [retrieved on Nov. 17, 2010], Nov. 18, 2002.

Lin, X., Header and Footer Extraction by Page-Association, Hewlett-Packard Company, May 6, 2002, pp. 1-8, Palo Alto, California, U.S.

Montanés, E., et al. , Towards Automatic and Optimal Filtering Levels for Feature Selection in Text Categorization, Advances in Intelligent Data Analysis VI, Sep. 2005, pp. 239-248.

PDF Reference Fifth Edition, Adobe Portable Document Format Version 1.6, Chapter 5.9, Adobe Systems Incorporated, 1985-2004, pp. 440-446.

Taghva et al., The Impact of Running Headers and Footers on Proximity Searching, Information Science Research Institute, University of Nevada, 2004, pp. 5, Las Vegas, Nevada, U.S.

Cattoni, R., et al., Geometric Layout Analysis Techniques for Document Image Understanding: A Review, Retrieved from the Internet: URL:http://tev.itc.it/people/modena/Papers/DOC_SEGstate.pdf [retrieved on Jan. 29, 2003], 1998, pp. 1-68.

* cited by examiner

CONTENT STYLE DETECTION

BACKGROUND

Content is increasingly being distributed in electronic form to an array of users for use on computing devices. Content may include traditional media such as books, magazines, newspapers, newsletters, manuals, guides, references, articles, reports, and documents. The content may exist in print and/or in electronic form, or may be transformed from print to an electronic form through the use of a scanning device. The Internet, in particular, has facilitated a wide publication of digital content through downloading and displaying of images of content. Additionally, as more content is transformed from print to electronic form, more images of content are becoming available online. In some instances, a page image allows a reader to view a page of content as it would appear in print.

Some users may have computing devices with displays that are sized differently from the display for which an image is originally formatted. Also, some users may wish to view the content in an image in a varyingly-sized window within a display. To accommodate these different viewing preferences, content providers have generated and maintained different versions of the same content to accommodate for various display conditions. However, this approach can be inefficient and costly.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

The disclosure is directed to a computer-implemented method, system, and computer-readable medium having instructions encoded thereon, for analyzing an image-based file containing objects. The analysis is directed at determining attributes of an image-based file including the format and style of objects presented in the image-based file. The image-based file is configured to automatically adapt itself to be rendered on various output media, such as various sized displays and windows on electronic media and/or printed media. The image-based file enables "reflowing." That is, it permits lines of objects to vary in presentation by modifying a line, a column, and a page distribution for an object in a "reflow" according to the given dimensions and limitations of a selected output medium, such as the size of a display or window. In the context of the present disclosure, the term "objects" includes a selection of one or more letters, characters, symbols, numbers, formulas, graphics, line drawings, table borders, textual content, etc., that may be used to represent information in an image. In an illustrative embodiment, identifiable content, such as words, can be represented as a single object. Alternatively, identifiable content can also be represented as a number of objects, such as when objects are letters arranged to form a word. As described above, reflow relates to the modification of line segmentation for the objects.

Generally speaking, the content style detection techniques disclosed herein may enable presentation of the image-based file including objects, such as text, while preserving aspects of the style of the text from the original presentation, such as the printed version in a scanned document. For example, the image-based file may contain a paragraph of words formatted with attributes including margin values, a line spacing value, tracking values, and justification rules. A reflowed image-based file may maintain at least a portion of these attributes despite the presentation display size or format constraints. The term "document" may include electronic and/or fixed medium collections of images, such as text, and may be compiled as a book, magazine, advertisement, newspaper, newsletter, manual, guide, reference, article, report, and any other communication medium for exchanging messages using visual means. For purposes of discussion, content style detection is described in the context of detecting the style of a paragraph of text in an image-based file. One illustrative implementation of this context is provided below. However, it should be appreciated that the described content style detection techniques may be implemented in other contexts. Moreover, other content style detection techniques may be performed by the illustrated architecture.

Illustrative System Architecture

Figure 1A:
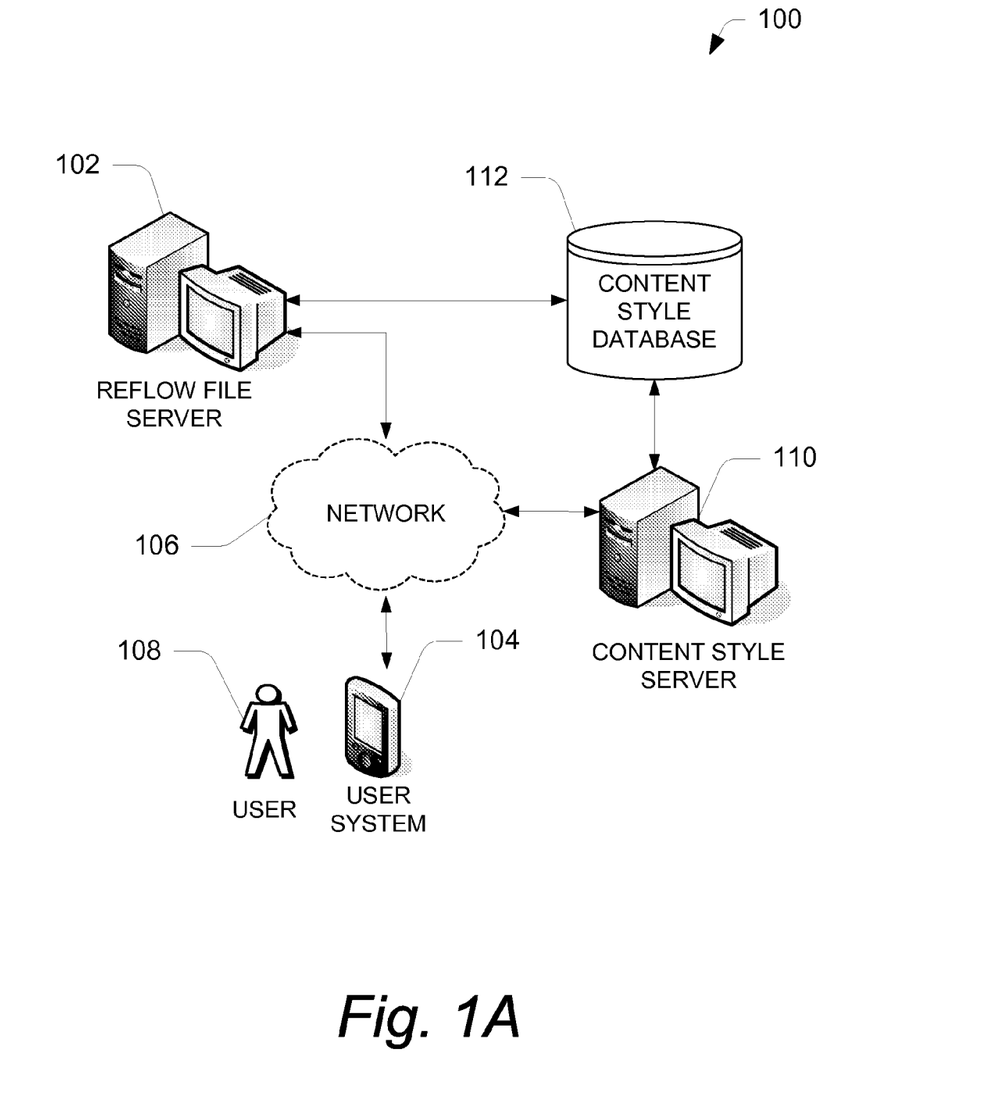
FIG. 1A is a pictorial diagram showing an illustrative computing environment in which embodiments of the invention may be implemented.

FIG. 1A is a pictorial diagram showing an illustrative computing environment 100, in which embodiments of paragraph style detection may be implemented. The environment 100 includes a reflow file server 102 and a user system 104 communicatively connected by a network 106, such as the Internet. The user system 104 is shown associated with a user 108. In the illustrated embodiment, the user system 104 is configured to receive one or more image-based reflowable files from the reflow file server 102 via the network 106, and to render them on an output media, such as a display screen. In an illustrative embodiment, a suitable viewer (e.g., e-book reader) application is operating on the user system 104 to cause it to render the image-based reflowable files on a display.

In accordance with an embodiment, a content style server 110 is communicatively coupled to a content style database 112. The content style server 110 communicates or otherwise provides content style information to the reflow file server 102 via the network 106 and/or a content style database 112. In one implementation, the content style server 110 may store content style information in the content style database 112. The reflow file server 102 retrieves the stored content style information and incorporates it in reflowed content which is transmitted to the user system 104 for display to the user 108.

The network 106 in FIG. 1 may be a Local Area Network ("LAN"), a larger network such as a Wide Area Network ("WAN"), or a collection of networks, such as the Internet. Protocols for network communication, such as TCP/IP, are well known to those skilled in the art of computer networks and may be used to implement the network connections described herein. Persons of ordinary skill in the art will recognize that the concepts disclosed herein may also be used in other interactive environments, such as local or wide area networks that connect servers storing related documents and associated files, scripts, and databases, or broadcast communication networks that include set-top boxes or other information appliances providing access to audio or video files, documents, scripts, databases, etc. Although embodiments are described herein as using a network such as the Internet, other distribution means are contemplated such transmitting information via memory cards, flash memory, or other portable memory devices.

Figure 1B:
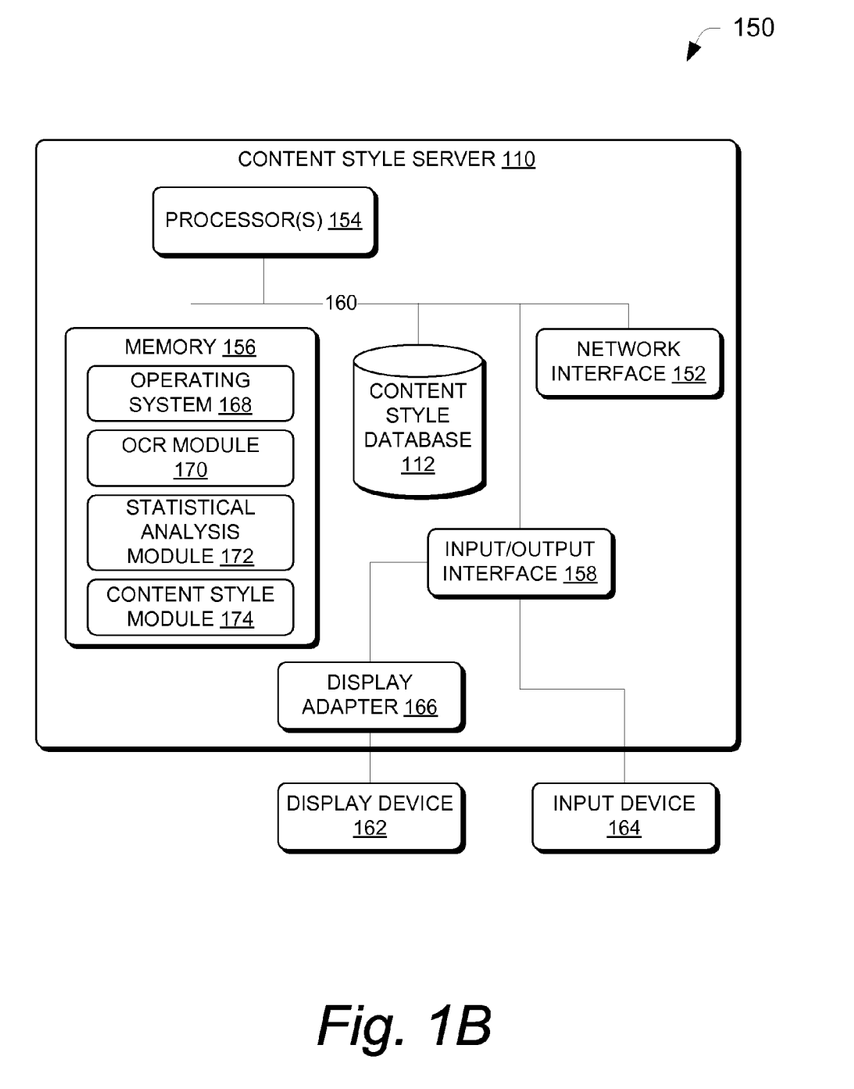
FIG. 1B illustrates an example architecture of the content style server of FIG. 1A, including a number of components for detecting the style of content in an image.

FIG. 1B illustrates an example architecture 150 of the content style server 110 of FIG. 1A, including a number of illustrative components for detecting the style of content in an image. The architecture 150 for the content style server 110 may be used to implement one or more embodiments of the present disclosure. Of course, those skilled in the art will appreciate that the content style server 110 may include greater or fewer components than those shown in FIG. 1B.

The content style server 110 connects to the network 106 using a network interface 152. The network interface 152 enables the content style server 110 to communicate data, control signals, data requests, and other information via the computer network 106. For instance, the content style server 110 may receive a file containing digital images of content having reflow objects therein from the network 106, via the network interface 152.

The content style server 110 further includes one or more processors 154, memory 156, and an input/output interface 158, all communicatively connected to each other and to the network interface 152 by a communication bus 160. A display device 162 may be a typical display device, such as a computer display (e.g., CRT or LCD screen), television screen, etc. The input/output interface 158 is configured to communicate with one or more external devices, such as an input device 164 to capture images of content having text therein (e.g., a document scanner). The input device 164 may be any device capable of capturing images including but not limited to a video camera, scanner, digital camera, copier, scanning pen, etc. The input/output interface 158 may also be configured to communicate with one or more external output devices, such as display adapter 166. The display adapter 166 provides signals to a display device 162 that may enable a user to observe and interact with information created by the content style server 110. The input/output interface 158 may also communicate with external devices not shown in FIG. 1B, such as a mouse, keyboard, pen, or other device that can be operated by a user.

The processor 154 is configured to operate in accordance with computer program instructions stored in a memory, such as the memory 156. Program instructions may also be embodied in a hardware format, such as a programmed digital signal processor. Furthermore, the memory 156 may be configured to store digital images of content having reflow objects therein for processing, transmission, and display in accordance with the present disclosure. The memory 156 generally comprises RAM, ROM, and/or permanent memory. In an embodiment, the memory 156 stores an operating system 168 for controlling the general operation of the content style server 110. The operating system 168 may be a general-purpose operating system such as a Microsoft® operating system, UNIX® operating system, or Linux® operating system.

In some embodiments, the memory 156 further stores an optical character recognition (OCR) module 170 comprised of program code and data designed to analyze digital images containing objects therein. Those of ordinary skill in the art will recognize a wide variety of algorithms and techniques capable of analyzing and recognizing objects in an image. For purposes of the present disclosure, however, it is not necessary that the algorithms and techniques actually recognize the individual characters or symbols or interpret their meanings, as achieved by many OCR routines. Rather, an OCR-like process may be used, in which limited information such as the baselines and the location and size of characters in a digital image is ascertained, but the actual identities of the characters need not necessarily be determined. As used herein, the term "character recognition" refers to all forms of character recognition using scanners and computer algorithms. Examples of commercially-available OCR software include OmniPage Pro™ from ScanSoft, Inc., and FineReader™ from Smart-Link Corporation.

The memory 156 may also include a statistical analysis module 172 for analyzing information associated with the objects. In an implementation, the statistical analysis module 172 may include an expectation maximization clustering algorithm for identifying images that are not properly grouped with images having similar attributes. For example, an image designated as having right justified text may be identified by the statistical analysis module 172 if it actually includes left justified text, thus being identified as an error, singleton, or outlier. The statistical analysis module 172 enables increased confidence in the accuracy of data that is processed by the content style server 110.

In accordance with an embodiment, the memory 156 additionally stores program code and data providing a content style module 174. The content style module 174 contains program code and data for analyzing a digital image received via the network interface 152, the input/output interface 158, etc., to generate and/or store content style information, such as the content information in the content style database 112. The content style information may be used by the reflow file server 102 (FIG. 1a) to format images for display on the user system 104. The formatted images are presented with at least a portion of the original image style information.

Illustrative Operation

Figure 2:
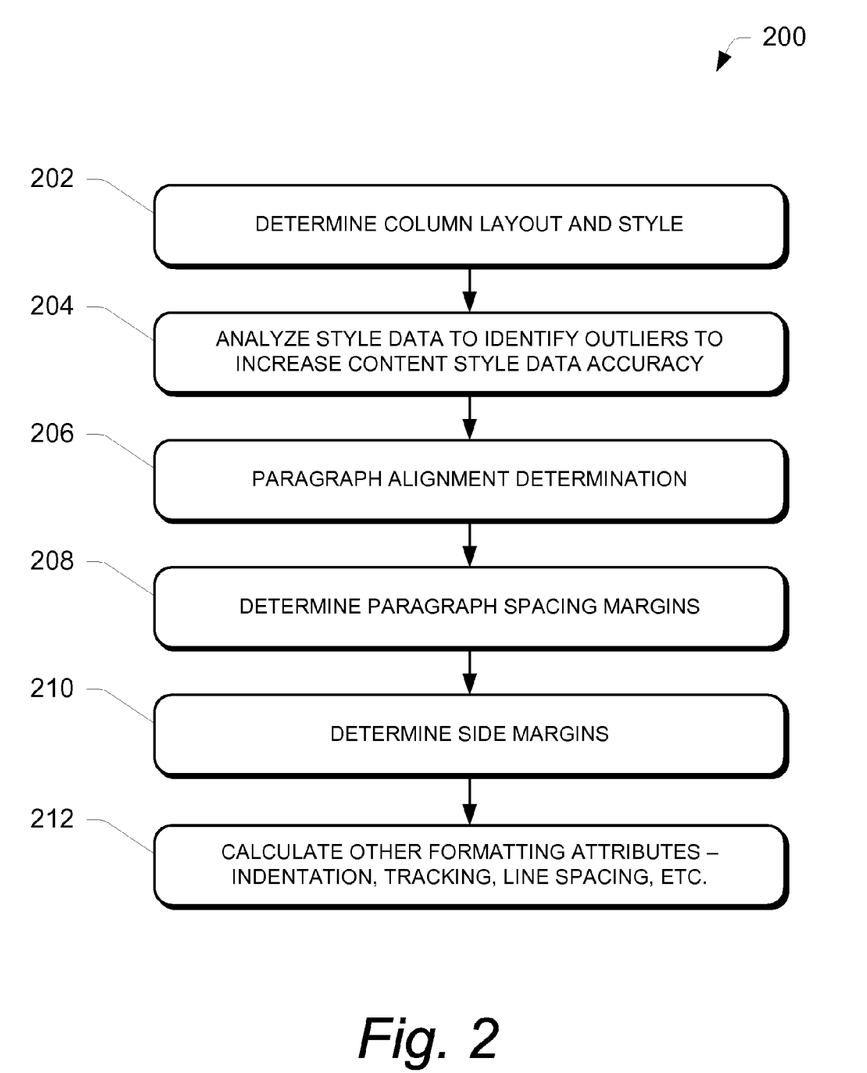
FIG. 2 is a flow diagram of an illustrative process for determining the style of content in accordance with an embodiment of the disclosure.

FIG. 2 is a flow diagram of an illustrative process 200 for determining the style of content in accordance with an embodiment of the disclosure. The process 200 is illustrated as a collection of blocks in a logical flow graph, which represents a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process 500 is described with reference to the architecture 150 of FIG. 1B.

The process 200 may begin by determining the column layout of a group of text in an image at 202. The determination may be determined by heuristics, conducted by human "editors," by optical scanning software (e.g., OCR module 170), and/or from extracting data from other sources, such as a publisher. The column layout is the layout of the group of text on the original presentation (e.g., printed book, pdf file, etc.). The column layout may be a single column or multi-column layout. In some instances, a mixed page may exist that switches the column count on the page, such as changing from a single column to a dual column layout. Typically, each image will be categorized by the column layout. The column layout may be stored in the content style database 112 and associated with a particular image.

In addition, the process 200 at 202 may determine a style for the group of text in the image 202. For example, the group of text may be assigned a style which includes information about the text (i.e., style attributes), such as without limitation an indentation value, font type, border size, or other related style data for the group of text. The style may be assigned to the group of text by a human "editor," by optical scanning software (e.g., OCR module 170), heuristics, and/or from extracting data from other sources, such as a publisher. The term "style," among other terms used herein, may be more fully described in U.S. patent application Ser. No. 11/540,852 entitled "Identifying Similarly Formed Paragraphs in Scanned Images" filed on Sep. 28, 2006.

In an embodiment, the content style server 110 may analyze the style designations determined at 202 for each column layout designation to ensure the accuracy of the content style data at 204. In an implementation, the statistical analysis module 172 may analyze the style assigned to the group of text to identify outliers, thus increasing the content style data accuracy. Any outliers identified at 204 may be redesignated with an accurate style designation or the outliers may be marked for further review, such as by a human editor.

The content style server 110 may determine the paragraph alignment of the group of text in an image at 206. The paragraph alignment (i.e., justification) may include a paragraph designation of right justification, left justification, center justification, and full justification. In an implementation, the content style module 174 may determine the paragraph alignment of the group of text by fitting lines to one or more paragraphs in an image and conducting a linear least squares regression analysis.

At 208, the content style server 110 determines the paragraph spacing margins. More specifically, the paragraph spacing margins refer to the top and bottom spacing included with a paragraph, which separate the paragraph from other paragraphs, text, or objects on a page. In an implementation, the content style module 174 may determine the paragraph spacing margins by analyzing the white space between consecutively arranged paragraphs and assigning the white space as a top margin spacing value to the subsequent paragraph. In addition, the side margin spacing may be determined at 210. The side margin spacing may include the right and left side margins. Typically, each paragraph is designated without additional margins. For example, a three column flow of text may be analyzed as three different images, each including a right and left margin, although the left and/or right margins may form a portion of an intermediate spacing between two adjacent columns in a multi-column display.

In further embodiments, the content style server 110 may calculate other formatting attributes for an image, at 212. For example, the content style module 174 may determine an indentation, a tracking value (i.e., space between letters of a word), and/or line spacing between consecutive lines of text in a paragraph. The content style module 174 may then store content style information for each paragraph style in the content style database 112 for further use by the reflow file server 102 in accordance with embodiments of the disclosure. For example, the output may be a style sheet for an image that is readable by a layout engine, such as a layout engine included in an electronic book reader.

Style Detection Implementation

Figure 3:
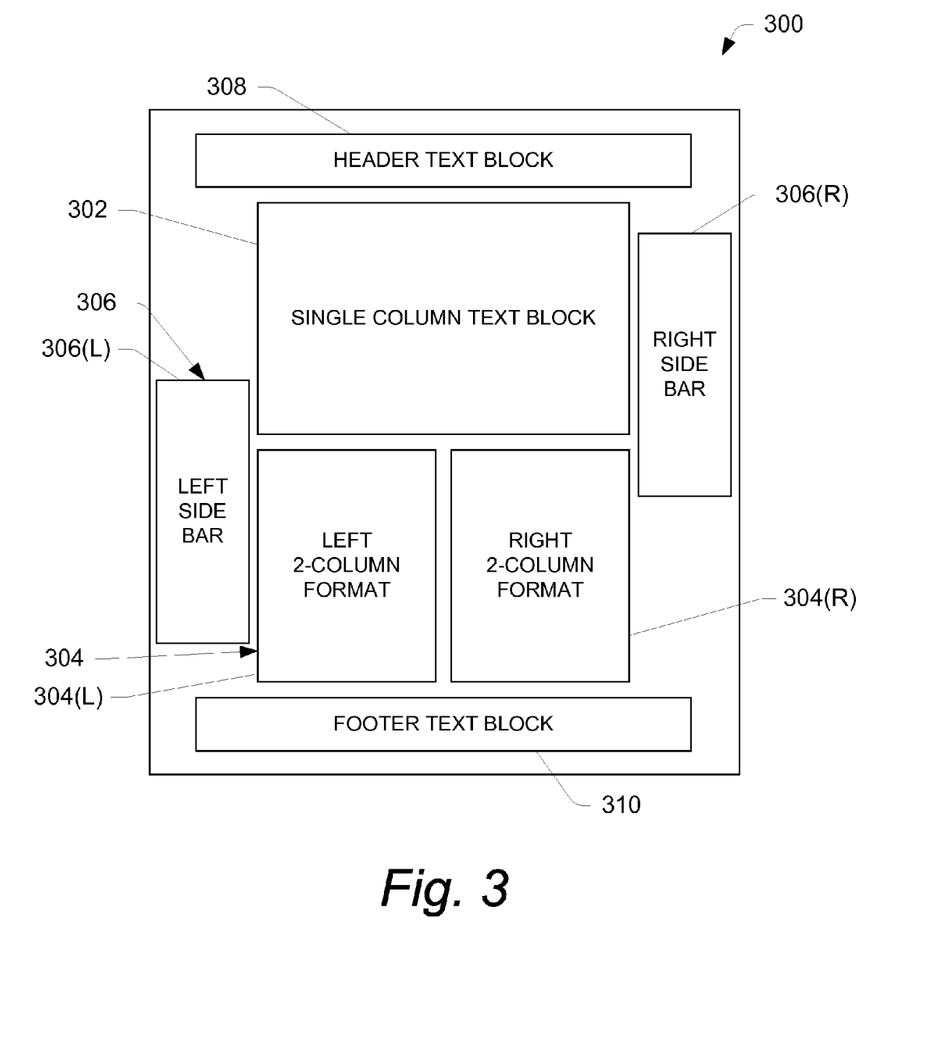
FIG. 3 shows an illustrative concept of column layout for content in a document, including side bar columns, single columns, multi-columns, and mixed page embodiments.

FIG. 3 illustrates a concept of column layout for content in a document, including side bar columns, single columns, multi-columns, and mixed page embodiments. An illustrative layout 300 includes a plurality of images of objects, such as paragraphs of text.

An approach to analyzing attributes of an object, such as the arrangement of text in a paragraph, includes grouping the objects with similarly situated objects. For example, paragraphs may be grouped with similarly situated paragraphs based on the paragraph location on a page of a document. As discussed above, a paragraph may be arranged in a single column 302 or a multi-column of text 304. Other arrangements to paragraphs or text may include sidebars 306, headers 308, and footers 310. Multi-column arrangements of paragraphs may be further grouped by the column position, such as a left-hand column 304(L) and right-hand column 304(R) in a two column arrangement. In instances were multi-column arrangements include center columns, additional grouping designations may be necessary. Similarly, sidebars may be grouped as a left-hand sidebar 306(L) and a right-hand sidebar 306(R).

In other implementations, images may be subdivided into groups based on a page location during an image creation process. For example, when scanning a book, even pages may include a first designation while odd pages may include a second designation. Other subdivisions are also contemplated to enable column grouping for each specific type of paragraph layout included in a document. Out-of-flow text elements are typically designated as singletons and treated separately from other column layout groups. For example, out-of-flow text may include text formatted around images.

Objects or paragraphs may be grouped in a column layout using a number of techniques. In one implementation, paragraphs are designated a column layout based on heuristics. Alternatively or in addition, paragraphs may be assigned to a column layout by a human editor and/or by an automated process such as an OCR-based identification process.

The objects or paragraphs include a style. The style may include information about the paragraphs (i.e., style attributes), such as without limitation an indentation value, font type, border size, or other related style data for a group of text. The style may be assigned to the group of text by a human "editor," by optical scanning software (e.g., OCR module 170), heuristics, and/or from extracting data from other sources, such as a publisher. In an example, a first paragraph may have a single column layout and a full margin style while a second paragraph has a single column layout and is a block quote style. Therefore, the first and second paragraphs may have the same column layout (single column), while having a different style (full margin as compared to block quotes).

In accordance with embodiments, the paragraphs are then analyzed for each column layout, such as by using the statistical analysis module 172, to identify any incorrect style designations designated as outlier paragraphs. Outlier paragraphs may be reevaluated by the human editor, designated to a new style group based on a closest match via a computer implemented algorithm, or stored as a singleton (unique paragraph). In some instances, the statistical confidence may be relaxed when a large number of outliers are identified. Other techniques may include using a computer implemented algorithm to determine an initial paragraph style or using information from third parties (e.g., publishers) to indicate the style for objects or paragraphs. For example, a book publisher may indicate that a group of paragraphs have the same style for a particular document, or portion thereof.

As discussed above, outlier paragraphs may be identified after the style has been determined, particularly when heuristics are used in the style determination. The style designation may be analyzed using a statistical analysis using the statistical analysis module 172 to identify paragraphs that do not have the same style characteristics as the other paragraphs given the same style designation. In an implementation, the statistical analysis may include an expectation maximization cluster algorithm.

Figure 4:
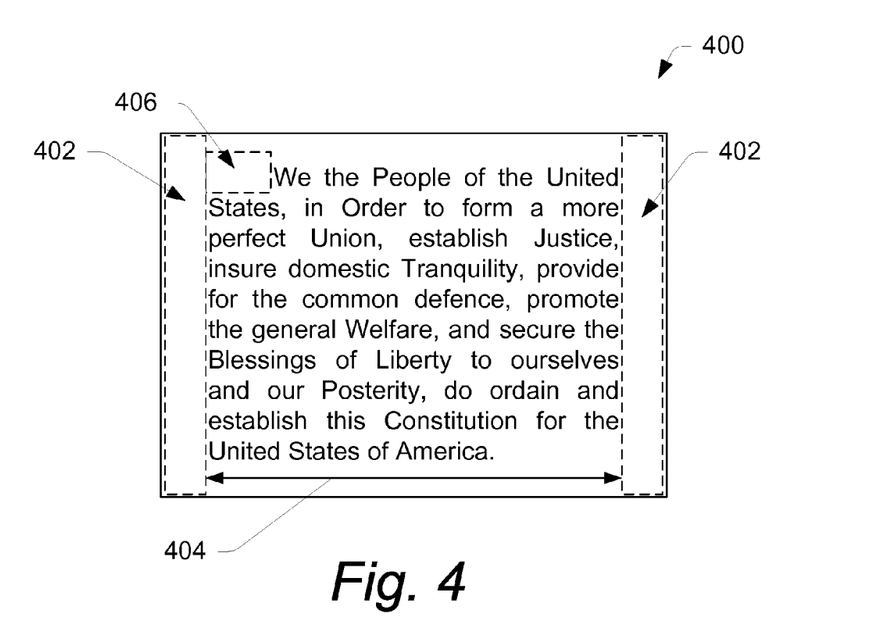
FIG. 4 shows an illustrative concept of paragraph style verification by analyzing attributes of an image.

FIG. 4 illustrates a concept of paragraph style verification by analyzing attributes of an image 400. The statistical analysis module 172 may calculate a probability of a particular paragraph being in the assigned style based on attributes of the particular paragraph. Each paragraph may include a number of attributes, which when analyzed, provide data to enable the statistical probability analysis to identify outlier paragraphs. The attributes may include side margin width 402, a paragraph width 404, and/or an indentation width 406, although a greater of fewer number of attributes may be used. The attributes of the image may be determined using OCR algorithms, or other known algorithms for detecting the presence of text in an image, and more particularly the boundary locations of text within an image.

A number of additional style aspects may be identified using the techniques described herein. It may be beneficial to provide a substantially accurate style designation in order to reduce the likelihood of outlier paragraphs corrupting data used to generate additional content style information, such as a horizontally extending margin value, a vertically extending margin value, or a paragraph alignment type. Typically, paragraphs may be analyzed to determine style information for each column layout designation in order to detect style characteristics specific to a particular column layout designation. Once the style of a paragraph is determined and confirmed through further analysis, the column layout designation may be discarded when the paragraphs are presented with a consistent column layout, such as in a uniform single-column layout. Therefore, the column layout designation may be used to enable accurate verification of styles for paragraphs, particularly for paragraphs in multi-column format which is later represented in single-column format. This technique enables allocation of white space between columns as left-side and right-side margins for the column. Varying levels of statistical accuracy may be employed in implementations, and some implementations may possibly include unidentified outliers in style groups.

Once the style of paragraphs has been determined, the style values of paragraphs having the same style may be averaged, or otherwise manipulated to reduce the variance across different style setting for paragraphs. For example, paragraph from a two column layout may be analyzed with a paragraph from a single column layout when both paragraphs have the same style and the style has been verified as described above. This may enable the creation of a single representative style for similar paragraphs once the column layout designation has been disregarded.

Figure 5A:
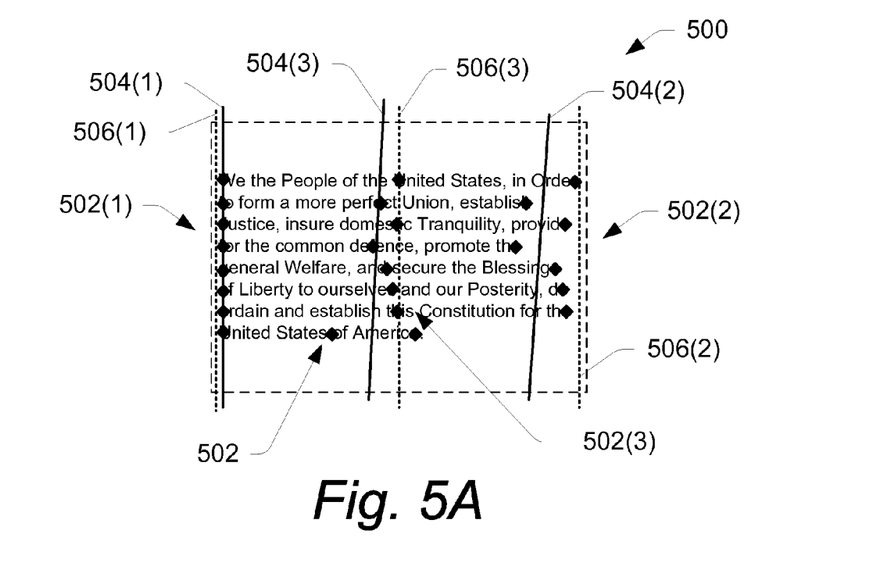
FIGS. 5A, 5B, and 5C show an illustrative concept of paragraph justification determination by generating reference lines through the left, right, and center of a paragraph.
Figure 5B:
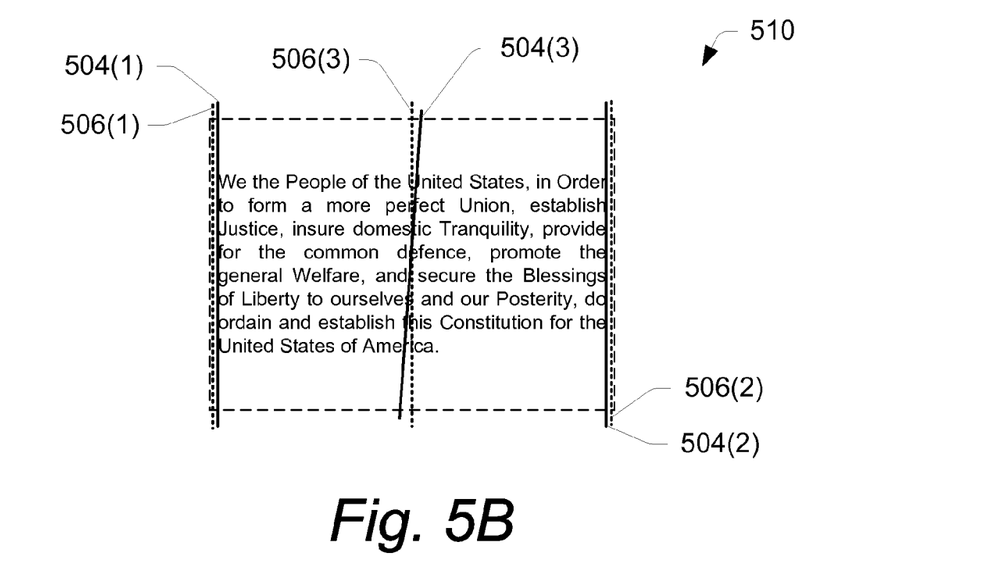
Figure 5C:
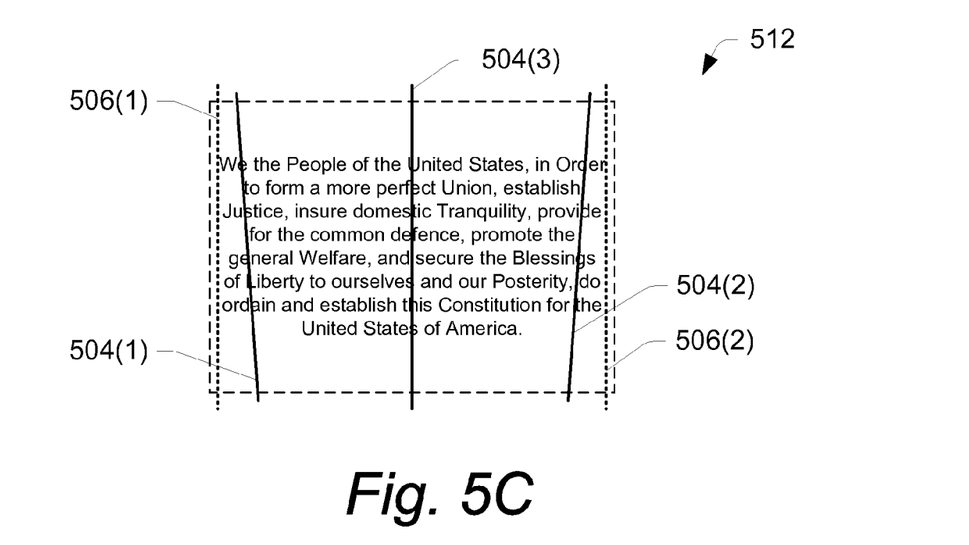

FIGS. 5A, 5B, and 5C illustrate a concept of paragraph justification determination by generating reference lines through the left, right, and center of a paragraph. In some instances, the paragraphs in an image of content may be identified as having paragraphs with the same style. Accordingly, the paragraphs may be analyzed together using techniques to determine the alignment of the paragraphs. In other instances, the image of content may include paragraphs having different styles. The variance of paragraphs styles may require a grouping of paragraphs from different images (e.g., scanned pages) to determine the alignment of similar pages. In the latter instance, the paragraphs may be additionally grouped as left-side paragraphs and right-side paragraphs based on their location in the document before the paragraph alignment is determined. The paragraph alignment may then be determined separately for the left-side group and the right-side group. The left-side and right-side designation may increase the accuracy of the paragraph alignment determination in some instances.

In one particular instance, a number of short paragraphs (e.g., one to three lines in length) may be located within the image. Short paragraphs may present problems during a paragraph alignment analysis because they lack an adequate amount of information to determine their respective justification. For example, a two-line sentence may be mistaken as being left justified when it has full justification. One example of a short paragraph is a header for a new section.

In an embodiment, a linear least-squares regression is used to fit lines through a number of points in one or more paragraphs. Other techniques for fitting lines to a number of points may be used in alternative embodiments. The lines may be generated on each paragraph or each group of paragraphs sharing a similar style on the same page of a document. For illustrative purposes, FIGS. 5A, 5B, and 5C depict a single paragraph approach, however, a full page grouping or other grouping of paragraphs may provide improved detection speed and accuracy in some instances.

In one embodiment, text in a paragraph 500 is analyzed using OCR or other known methods to create a number of reference points 502 used to locate reference lines 504. As illustrated in FIG. 5A, a first set of reference points 502(1) locates the left-hand edge of each line of text in the paragraph 500. A first reference line 504(1) is fit though the first set of reference points. A second set of reference points 502(2) locates the right-hand edge of each line while a third set of reference points 502(3) locates the median point of each line of text. A second reference line 504(2) is fit through the second set of reference points 502(2) and a third reference line 504(3) is fit through the third set of reference points 502(3). In other implementations, the points may be fit for each line of text, alternating lines of text, or another selection of lines of text.

A number of image lines 506 may be fit to the image to assist in determining justification of the paragraph. A left-hand image line 506(1) and a right-hand image line 506(2) are parallel to each other and mark the left and right sides of the image, respectively. In addition, a center image line 506(3) may be used to mark the midpoint between the image lines 506(1)-506(2) in an embodiment.

A number of techniques may be used to determine the justification based on the correlations between the reference points 502, the reference lines 504, and/or the image lines 506. For example, the reference lines 504 may be compared to the image lines 506. If the left-hand reference line 504(1) aligns with the left-hand image line and the right-hand reference line 504(2) aligns to the right hand image line 506(2), then a paragraph 510 has full justification as illustrated in FIG. 5B. If only the left-hand reference line 504(1) aligns with the left-hand image line 506(1), then the paragraph has left justification as illustrated in FIG. 5A. Conversely, if only the right-hand reference line 504(2) aligns with the right-hand image line 506(2), then the paragraph has right justification. Center justification as illustrated in FIG. 5C may be determined by poor or no alignment between the left-hand line 504(1), the right-hand line 504(2), the left-hand image line 506(1), and the right-hand image line 506(2). Alternatively, if the third reference line 504(3) is parallel to the image lines 506 or aligns with the center image line 506(3), then a paragraph 512 has center justification.

In another implementation, the fit of the reference points 502 to the corresponding reference line 504 may enable a determination of the justification of a paragraph. For example, if the first set of reference points 502(1) fall on the left-hand reference line 504(1), then the paragraph is likely either left justified or full justified. As illustrated in FIG. 5A, the first set of reference points 502(1) fall on the left-hand reference line 504(1) while the second set of reference points 502(2) do not fall on the reference line 504(2), therefore indicating that the paragraph 500 has left justification. Other techniques for determining paragraph justification using the reference lines 504 and the image lines 506 may include comparing the equations or the slopes of reference lines to corresponding image lines.

As previously discussed, short paragraphs having one to three lines may present difficulties when attempting to determine the paragraph alignment for the short paragraph. In such instances, short paragraphs may be jointly analyzed with other paragraphs having the same style when applying the line fitting technique. For example, short paragraphs may be analyzed with other paragraphs on the same page of a document that have the same style, or short paragraphs may be analyzed with other short paragraphs from different images or pages having the same style. In some embodiments, a threshold used for the justification determination may be relaxed to increase the likelihood of determining a paragraph alignment type. In some instances, paragraph alignment for short paragraphs may not be possible, such as for a group of headings that only span a portion of a single line of text. These short paragraphs may be treated as singletons. In some implementations, short paragraphs may not include a designation for full justification because full justification is typically ineffective for a presentation of a short paragraph.

When determining the justification or other style attributes for a group of images, such as all of the single column images, a number of sampling techniques may be used. In one implementation, all of the images for a style may be analyzed to determine the justification or another style attribute. Alternatively, a representative sample may be selected from among the group of paragraphs have the same style. In embodiments, all of the images in a style group may be assigned the same justification while in other embodiments, each image may have its paragraph alignment, or other style attribute, determined based on the analysis for that particular paragraph. For example, a 300 page book may include 500 paragraphs of single column text and 300 paragraphs having a two column layout subdivided into 150 paragraphs of a right column layout and 150 paragraphs of a left column layout. An analysis of the paragraph alignment for the single column paragraphs may include analyzing the paragraphs using the above disclosed paragraph alignment determination techniques for a sample of 20 paragraphs, and assigning the determined alignment to all 500 paragraphs in single column format. The right column paragraphs may be analyzed and assigned an alignment type on an individual basis, therefore requiring analysis of all 150 of the right column paragraphs.

In some implementations, the groups of paragraphs may be analyzed for consistency in style determination which may be a function of obtaining images from documents, such as books that are scanned to create the images. For example, if the paragraph alignment determination for a group of paragraphs does not have statistically significant results, then the group of paragraphs may be subdivided into smaller logical groupings. For example, the paragraphs may be subdivided into a grouping based on page side (odd or even pages) of a document, or by other subdivisions. The paragraphs are then re-analyzed for each subgroup. This process may continue until statistically significant results are obtained, the confidence interval is reduced, and/or an inspection of the paragraphs is conducted by other techniques, including human oversight.

In still further embodiments, style detection such as paragraph alignment may be determined using other techniques in combination with a weighting algorithm to determine the actual style designation. For example, human editors may determine the paragraph alignment for paragraphs in a particular style group. Additionally or alternatively, OCR software may also be used to determine the paragraph alignment for paragraphs. For a group of paragraphs in a style group, a weight may be assigned to each technique for determining paragraph alignment (or another style attribute), such as human editor designation, OCR designation, and/or line fitting. In some instances, only a portion of all techniques for determining a style attribute may be available.

The weight for a style determination technique may correspond to the confidence factor for the particular technique. For example, a paragraph may be determined to be left justified by a human editor designated with an 80% confidence, determined to be center justified by an OCR software program having a 50% confidence, and full justified as determined by a linear-least squares line fitting algorithm having a confidence of 95%. In such an instance, the paragraph may be designated as being a full justified paragraph because the line fitting algorithm has the highest confidence factor and/or the combined weighting of the different designations indicates a full justification paragraph. Although weighting algorithms are described with reference to paragraph alignment, it should be understood that weighting algorithms may be used with any of the embodiments disclosed herein for determining a style designation for an image including an object, such as a paragraph of text. In another implementation, the weights may be multiplication factors, such as 3× for human editors, 2× for line fitting, and 1× for OCR software, where the greatest confidence factor is assigned to the human editor.

Figure 6:
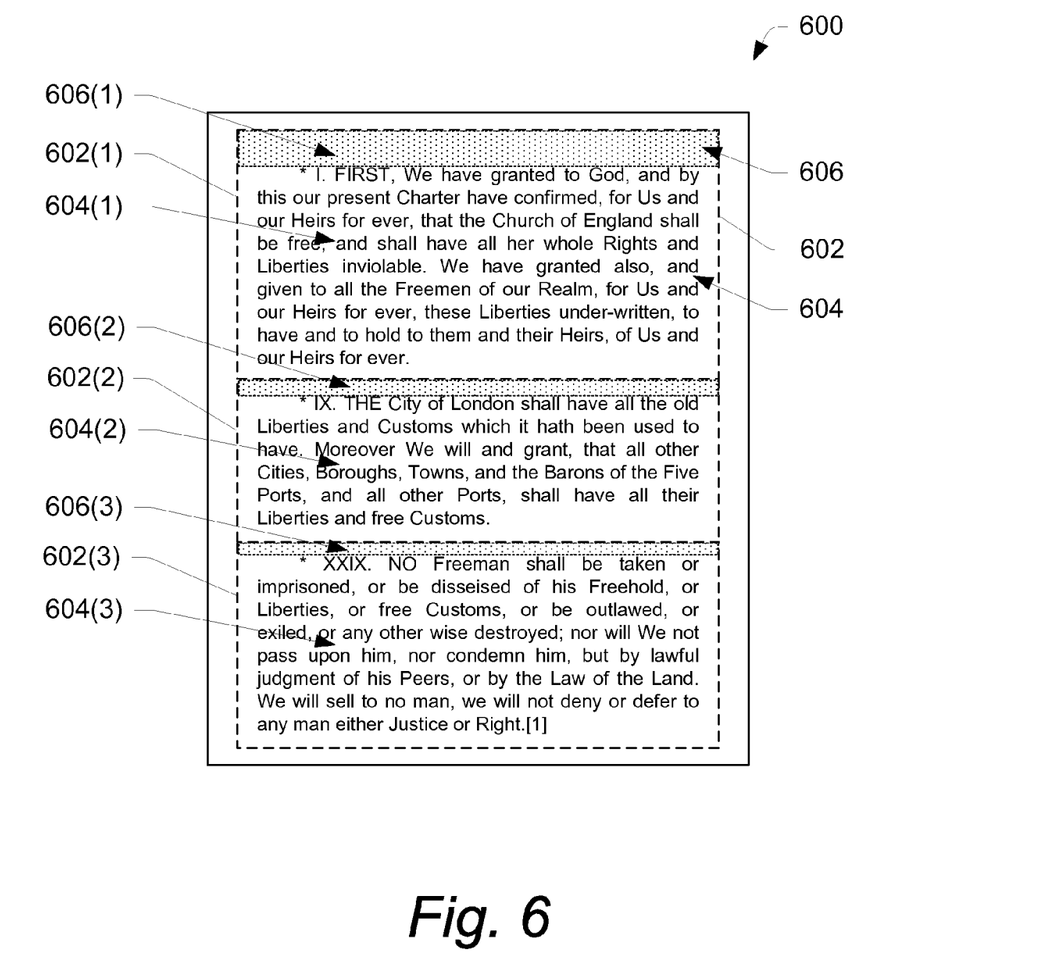
FIG. 6 shows an illustrative concept of top margin spacing for a plurality of paragraphs presented in a document.
Figure 7:
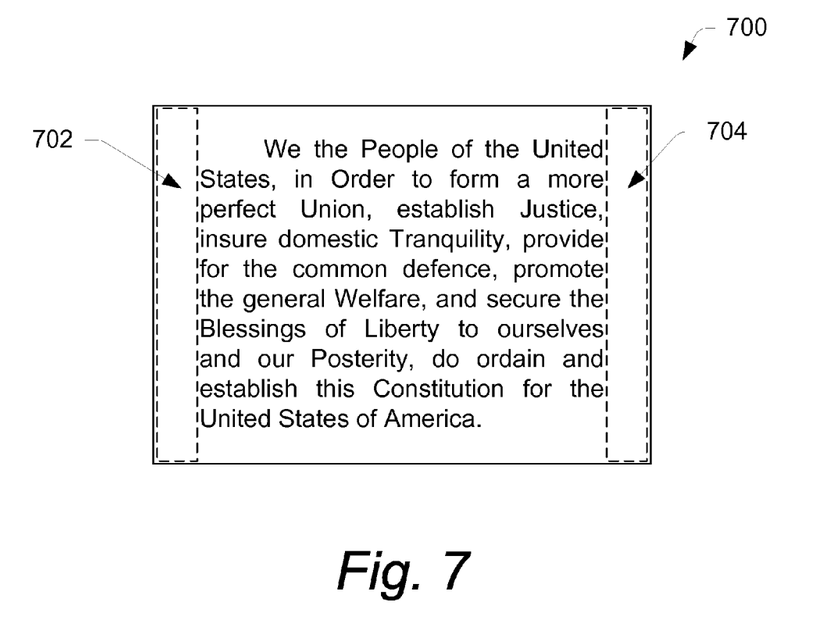
FIG. 7 shows an illustrative concept of side margin spacing for a paragraph presented in a document.

FIG. 6 and FIG. 7 illustrate techniques for determining the margin spacing of paragraphs of text in an image. Margins provide a separation between paragraphs of text of adjacent images. In some embodiments, all four margins (top, bottom, left, and right) may be determined and used to locate a paragraph within the image. Alternatively, at least one of a top or a bottom margin and at least one of a right and a left margin may be adequate to provide spacing between paragraphs of text of adjacent images. For example, if two images are each assigned a top margin and right margin, then an arrangement of the two paragraphs adjacent to each other will always include a margin separating the paragraphs of text. Therefore, a transition between paragraphs would include a white space (margin) in instances where paragraphs are consistently assigned the same side margin (e.g., right margins) and the same vertically extending margins (e.g., top margin).

FIG. 6 illustrates a concept of top margin spacing for a plurality of paragraphs presented in a document 600. The document includes a plurality of images 602. Each image 602 includes a paragraph 604 and a white space above the paragraph. In an implementation, the white space is assigned to a top margin 606 (e.g., a margin value) to provide a transition between each of the paragraphs 604. Therefore, when images 602(1), 602(2), and 602(3) having paragraphs 604(1), 604(2), and 604(3) are consecutively located on a display, top margins 606(2) and 606(3) provide a transition of white space between each of the paragraphs.

In accordance with embodiments, paragraphs in each document are analyzed to determine the most common amount of white space (top margin) between consecutive paragraphs based on the style of the preceding paragraph and the subsequent paragraph (e.g., representative paragraph), and then the margin value is assigned to the representative paragraph to create the top margin 606. In one implementation, white space may be determined using the OCR module 170. For example, the bottom line of text of a first paragraph may be established and compared to the top line of text of a consecutively located subsequent paragraph to enable the determination of an offset equal to the margin value. The top margin values may be determined for all paragraphs in a style group, or a portion thereof. In an implementation, the top margin values may be standardized for each style variation. For example, a representative paragraph with a style may include a first margin value for a transition from a first preceding paragraph having a first alternate style and a second margin value from a transition from a second preceding paragraph having a second alternative style, and so forth. Each variation of the margin value may be averaged or otherwise manipulated to create a representative margin value. Although FIG. 6 illustrates the creation of top margins, bottom margins or both top and bottom margins may additionally or alternatively be determined for each paragraph in accordance with embodiments of the disclosure.

Specialized margin values may be used for all transitions that do not include consecutively placed paragraphs having the same style. For example, top margins may be determined separately from transition margins in order to minimize unnecessary white space in an electronic display of the document, such as in an electronic book.

FIG. 7 illustrates a concept of side margin spacing for a paragraph presented in a document 700. Paragraphs may be grouped by their style and analyzed to determine side margin spacing for a left margin 702 and a right margin 704. The side margin value is determined for each paragraph based on the transition between paragraphs in the document 700 using the OCR module 170 or other methods known in the art for determining the size of the side margin. Similar to paragraph justification, side margin determination typically applies to paragraphs with at least three lines of text. In instances where short paragraphs are present, the short paragraphs may be analyzed with other paragraphs on the same page having the same style.

The side margins may be analyzed based on their content layout group. The side margins may be further grouped by page (odd or even). In one implementation, the side margins for a content layout group may be analyzed with the statistical analysis module 172, such as by an expectation maximization clustering algorithm, to determine the clusters of values of the left margin 702 and the right margin 704 white space combinations present in the content layout group. Next, the smallest clustered value (i.e., the least whitespace value) may be set to zero for that side margin. All other paragraphs in the content layout group may be given left and right margin values relative to the minimum value. Finally, the values for each style group (regardless of the content layout group designation) are analyzed to create an average or median value for the paragraphs within the style. For example, if three paragraphs have right margins of 1.0", 1.7", and 0.6", then the minimum value of 0.6" would be set to 0.0" and the relative margin values for the group would be 0.4", 1.1", and 0.0", respectively. The median value would be 0.4" and the average side margin value would be 0.5". In some implementations, the left margin 702 and the right margin 704 may be combined and share the same margin value. Alternatively, the left margin 702 and the right margin 704 may have the margin values determined separately to create distinct values for the left and right side margins.

In some instances, a paragraph may include an adjacent sidebar or other non-typical style of text which may disrupt the side margin determination. These unique paragraphs may be disregarded during analysis or treated as a singleton. The unique paragraphs may have the median or average value side margin assigned to them for their style grouping in an embodiment.

Figure 8:
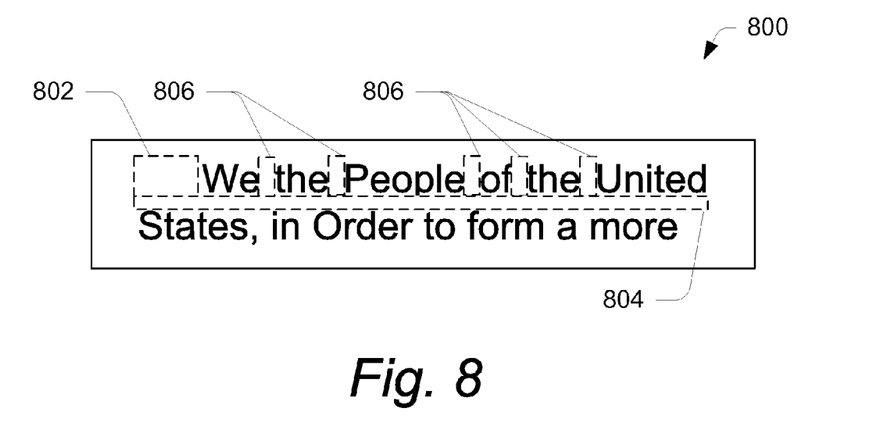
FIG. 8 shows an illustrative concept of paragraph attribute determination for indentations, line spacing, and tracking for a paragraph presented in a document.

FIG. 8 illustrates a concept of paragraph attribute determination for indentations, line spacing, and tracking for a paragraph presented in a document 800. An indentation 802 may be determined for each paragraph. In addition, a line spacing 804 may be determined for each paragraph. In an embodiment, the indentation 802 and the line spacing 804 values may be analyzed by the statistical analysis module 172 to create indentation and line spacing values for paragraphs in each style group. Alternatively, each paragraph may include its own indentation and line spacing values.

In accordance with embodiments, a tracking value (distance between words) may be determined for a paragraph. In instances where the paragraph is fully justified, the tracking values may be associated with words or may be recorded as minimum and maximum values, which enable reflowing of text while preserving the full justification of the paragraph. Paragraphs without full justification may establish a tracking number for all paragraphs in each style group. Attributes of the image may be determined using OCR algorithms or other methods known in the art for image analysis.

Illustrative Style Detection and Reflow of Images

In accordance with embodiments of the disclosure, the operation of an illustrative content style detection server is disclosed. The content style server 110 receives a document via an input device 164 (e.g., scanned image of a book), the network interface 152 (e.g., electronic document from a publisher), or via other means. Each page of the document is analyzed by at least one of a human editor, heuristics, or OCR software to determine a column layout and a style for each paragraph. A statistical analysis may be conducted on the paragraphs to further ensure that an accurate style is designated for each paragraph. The style for paragraphs may then be used for grouping paragraphs and creating standardized values for the style group for style attributes such as a paragraph justification, a vertically extending margin, a horizontally extending margin, an indentation, a line spacing value, and a tracking value.

The content style server 110 determines a value for each paragraph for the paragraph justification, the vertically extending margin, the horizontally extending margin, the indentation, the line spacing, and the tracking and stores them as paragraph style attributes in the content style database 112. The reflow file server 102 may then use the data in the content style database 112 to format images transmitted to the user system 104, or otherwise presented on the user system 104, such that the images when viewed on the user system provide at least a portion of the original presentation of the image, such as the presentation of the book or the electronic document supplied by the publisher.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method of detecting a style of content of an image, the method comprising:
 as implemented by one or more computing devices configured with specific executable instructions,
  obtaining an image of content including paragraphs, each paragraph belonging to a column layout group and a candidate style group, the candidate style group determined by style attributes of the paragraphs, wherein the style attributes include at least one of an indentation, a tracking value or line spacing between consecutive lines of text in the paragraph;
  clustering the paragraphs of each candidate style group in the column layout group to identify outlier paragraphs having the style attributes outside of a threshold range of the style attributes;
  removing the outlier paragraphs from the candidate style group to create a stylized paragraph group;
  selecting at least one of the paragraphs in the stylized paragraph group according to a dimension of a display or window of a user system; and
  outputting the paragraphs from the image to the user system using the selected at least one of the paragraphs in the stylized paragraph group.

2. The computer-implemented method as recited in claim 1, further comprising sorting the paragraphs into the column layout group by employing heuristics.

3. The computer-implemented method as recited in claim 1, wherein clustering the paragraphs of each candidate style group in the column layout group includes comparing the style attributes of the paragraphs with the style attributes of a control paragraph, the style attributes including at least one of a right-side white space, a left-side white space, an indentation, or a paragraph width.

4. The computer-implemented method as recited in claim 1, further comprising:
 determining a side margin value of each paragraph in each content layout group;
 determining a minimum side margin value of the paragraphs in the content layout group;
 reducing the side margin value of the paragraphs in the content layout group by the minimum side margin value to create a reduced side margin value; and
 determining a representative side margin value based at least in part on the reduced side margin value of each stylized paragraph group.

5. The computer-implemented method as recited in claim 4, wherein determining a representative side margin value includes determining a right-side margin value and a left-side margin value of each paragraph.

6. The computer-implemented method as recited in claim 4, further comprising storing the paragraph with the representative side margin value.

7. A computer-implemented method comprising:
 as implemented by one or more computing devices configured with specific executable instructions,
  obtaining an image of content including paragraphs, each paragraph belonging to a column layout group and a candidate style group, the candidate style group determined by style attributes of the paragraphs, wherein the style attributes include at least one of an indentation, a tracking value or line spacing between consecutive lines of text in the paragraph;
  within the candidate style group of the column layout group, comparing the style attributes of each paragraph to the style attributes of a control paragraph to identify outlier paragraphs having style attributes outside a predetermined attribute value range;
  removing the outlier paragraphs from the candidate style group, the remaining paragraphs being stylized paragraphs;
  determining a side margin value of each of the stylized paragraphs based at least in part on a content layout group;
  determining a minimum side margin value of the stylized paragraphs in the content layout group based at least in part on the determined side margin values;
  reducing the side margin value of the stylized paragraphs in the content layout group by the minimum side margin value to create a reduced side margin value, the reduced side margin value included in a modified paragraph format;
  selecting at least one of the stylized paragraphs with the modified paragraph format according to a dimension of a display or window of a user system; and
  displaying the image of content on the user system using the selected at least one stylized paragraph with the modified paragraph format.

8. The computer-implemented method as recited in claim 7, further comprising determining a vertically extending margin of the stylized paragraphs by:
 selecting a representative paragraph and a preceding paragraph immediately preceding the representative paragraph;
 determining a margin space between the preceding paragraph and the representative paragraph; and
 associating the margin space and a preceding paragraph style attribute with the representative paragraph in the modified paragraph format.

9. The computer-implemented method as recited in claim 8, further comprising determining a paragraph justification by:
 identifying the stylized paragraphs in a style group;
 determining a paragraph alignment type of the stylized paragraphs in the style group; and
 associating the paragraph alignment type of the stylized paragraphs with the modified paragraph format.

10. A computer-implemented method of analyzing an image to create content style attributes, comprising:
 as implemented by one or more computing devices configured with specific executable instructions,
  obtaining a collection of content having a plurality of paragraphs;
  sorting the plurality of paragraphs by a style attribute to create a paragraph style group comprising of a consecutive arrangement of the plurality of paragraphs, wherein the style attribute includes at least one of an indentation, a tracking value or line spacing between consecutive lines of text in the paragraph;
  identifying outlier paragraphs having the style attribute outside of a threshold range for the style attribute;
  removing the outlier paragraphs to create a stylized paragraph group,
  determining a paragraph alignment type of the stylized paragraph style group;
  selecting the paragraph alignment type of the paragraphs in the stylized paragraph group according to a dimension of a display or window of user system; and displaying the collection of content on the user system using the selected paragraph alignment type.

11. The computer-implemented method as recited in claim 10, wherein the collection of content comprises an image of a page, the page including paragraphs in a paragraph style group.

12. The computer-implemented method as recited in claim 10, wherein the collection of content comprises a plurality of images of pages of content.

13. The computer-implemented method as recited in claim 12, further comprising sorting the plurality of paragraphs as a left-side page paragraph and a right-side page paragraph, and wherein determining the paragraph alignment type of each paragraph style includes determining the paragraph alignment type of the left-side page paragraphs and determining the paragraph alignment type of the right-side page paragraphs.

14. The computer-implemented method as recited in claim 10, wherein determining a paragraph alignment type includes fitting three reference lines to the paragraph style group, including a left reference line, a right reference line, and a center reference line, the reference lines being analyzed to determine the paragraph alignment type.

15. The computer-implemented method as recited in claim 14, wherein analyzing the reference lines includes comparing an alignment of the reference lines to an alignment of guide lines generated for a left image border and a right image border.

16. A computer-implemented method of determining a margin of a paragraph, the method comprising:
as implemented by one or more computing devices configured with specific executable instructions,
obtaining a collection of content having a plurality of paragraphs;
determining a paragraph alignment type of the paragraphs;
sorting the plurality of paragraphs by a style attribute to create a paragraph style group, the style attribute including at least the paragraph alignment type and at least one of an indentation, a tracking value or line spacing between consecutive lines of text in the paragraph;
selecting a representative paragraph and a preceding paragraph immediately preceding the representative paragraph;
determining a margin space between the preceding paragraph and the representative paragraph;
associating the style attribute of the preceding paragraph and the representative paragraph with the margin space;
for each unique combination of style attributes of preceding paragraphs and representative paragraphs, determining a representative margin space based at least in part on the margin space of the representative paragraphs, the representative margin space assigned to the representative paragraphs;
selecting the paragraph style group and the representative margin space according to a dimension of a user system; and
displaying the collection of content to the user system using the selected paragraph style group and the selected representative margin space.

17. The computer-implemented method as recited in claim 16, wherein the margin space comprises a top margin of the representative paragraph.

18. The computer-implemented method as recited in claim 16, further comprising storing the representative margin space of the representative paragraph as a modified paragraph format.

19. One or more non-transitory computer-readable media storing computer-executable instructions that, when executed on one or more processors, performs acts comprising:
obtaining an image of content including paragraphs belonging to a column layout group and a style group;
clustering the paragraphs of each style group in the column layout group to identify outlier paragraphs having style attributes outside of a threshold range of the style attributes, wherein the style attributes include at least one of an indentation, a tracking value or line spacing between consecutive lines of text in the paragraph;
removing the outlier paragraphs from each style group to create stylized paragraphs;
determining a paragraph alignment type of the stylized paragraphs of each style group;
determining at least one of a horizontally extending margin or a vertically extending margin of the stylized paragraphs of each style group;
associating the at least one horizontally extending margin, vertically extending margin, or paragraph alignment type of the stylized paragraphs of each style group with a paragraph attribute type;
selecting a paragraph attribute type according to a dimension of a user system; and
displaying the image of content on the user system using the selected paragraph attribute type.

20. The one or more non-transitory computer-readable media as recited in claim 19, wherein determining the horizontally extending margin further comprises:
determining a side margin value of the stylized paragraphs of each column layout group;
determining a minimum side margin value of the stylized paragraphs associated with the column layout group;
reducing the side margin value of the stylized paragraphs in the column layout group by the minimum side margin value to create a reduced side margin value; and
determining a representative side margin value based at least in part on the reduced side margin value of the stylized paragraphs of each style group.

21. The one or more non-transitory computer-readable media as recited in claim 19, wherein determining the vertically extending margin further comprises:
selecting a representative paragraph and a preceding paragraph immediately preceding the representative paragraph;
determining a margin space between the preceding paragraph and the representative paragraph; and
associating the margin space and a preceding paragraph style attribute with the representative paragraph to create the vertically extending margin.

* * * * *

UNITED STATES PATENT AND TRADEMARK OFFICE
CERTIFICATE OF CORRECTION

Page 1 of 1

PATENT NO. : 8,782,516 B1
APPLICATION NO. : 11/963786
DATED : July 15, 2014
INVENTOR(S) : William D. Dozier It is certified that error appears in the above-identified patent and that said Letters Patent is hereby corrected as shown below:

In the Claims

In column 14 at line 62, In Claim 10, change "group," to --group;--.

In column 14 at line 64, In Claim 10, after "paragraph" delete "style".

Signed and Sealed this
Seventh Day of April, 2015

Michelle K. Lee
*Director of the United States Patent and Trademark Office*